(12) United States Patent
Salo

(10) Patent No.: US 11,934,535 B2
(45) Date of Patent: *Mar. 19, 2024

(54) SYSTEM AND METHOD FOR IDENTIFYING CYBERTHREATS FROM UNSTRUCTURED SOCIAL MEDIA CONTENT

(71) Applicant: PROOFPOINT, INC., Sunnyvale, CA (US)

(72) Inventor: Daniel Clark Salo, Sunnyvale, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/169,627

(22) Filed: Feb. 15, 2023

(65) Prior Publication Data

US 2023/0205894 A1    Jun. 29, 2023

Related U.S. Application Data

(63) Continuation of application No. 16/823,090, filed on Mar. 18, 2020, now Pat. No. 11,586,739.

(60) Provisional application No. 62/955,595, filed on Dec. 31, 2019.

(51) Int. Cl.
| | | |
|---|---|---|
| *G06F 16/00* | (2019.01) | |
| *G06F 16/338* | (2019.01) | |
| *G06F 16/35* | (2019.01) | |
| *G06F 16/36* | (2019.01) | |
| *G06F 21/57* | (2013.01) | |

(52) U.S. Cl.
CPC .......... *G06F 21/577* (2013.01); *G06F 16/338* (2019.01); *G06F 16/355* (2019.01); *G06F 16/36* (2019.01)

(58) Field of Classification Search
CPC .... G06F 21/577; G06F 16/338; G06F 16/355; G06F 16/36

See application file for complete search history.

(56) References Cited

U.S. PATENT DOCUMENTS

| | | | |
|---|---|---|---|
| 10,572,576 B1 * | 2/2020 | Marc-Aurele | G06F 40/279 |
| 10,812,500 B2 * | 10/2020 | Rao | G06F 16/13 |
| 11,228,610 B2 * | 1/2022 | Medalion | H04L 63/1433 |
| 2014/0156645 A1 * | 6/2014 | Brust | G06F 3/0481 707/722 |
| 2019/0238564 A1 * | 8/2019 | Rao | G06F 16/183 |

* cited by examiner

*Primary Examiner* — Debbie M Le
(74) *Attorney, Agent, or Firm* — Sprinkle IP Law Group

(57) ABSTRACT

A cyberthreat detection system queries a content database for unstructured content that contains a set of keywords, clusters the unstructured content into clusters based on topics, and determines a cybersecurity cluster utilizing a list of vetted cybersecurity phrases. The set of keywords represents a target of interest such as a newly discovered cyberthreat, an entity, a brand, or a combination thereof. The cybersecurity cluster thus determined is composed of unstructured content that has the set of keywords as well as some percentage of the vetted cybersecurity phrases. If the size of the cybersecurity cluster, as compared to the amount of unstructured content queried from the content database, meets or exceeds a predetermined threshold, the query is saved as a new classifier rule that can then be used by a cybersecurity classifier to automatically, dynamically and timely identify the target of interest in unclassified unstructured content.

20 Claims, 4 Drawing Sheets

SYSTEM AND METHOD FOR IDENTIFYING CYBERTHREATS FROM UNSTRUCTURED SOCIAL MEDIA CONTENT

CROSS-REFERENCE TO RELATED APPLICATIONS

This application is a continuation of, and claims a benefit of priority under 35 U.S.C. § 120 from, U.S. patent application Ser. No. 16/823,090, filed Mar. 18, 2020, now U.S. Pat. No. 11,586,739, entitled "SYSTEM AND METHOD FOR IDENTIFYING CYBERTHREATS FROM UNSTRUCTURED SOCIAL MEDIA CONTENT," which claims a benefit of priority under 35 U.S.C. § 119(e) from U.S. Provisional Application No. 62/955,595, filed Dec. 31, 2019, entitled "SYSTEM AND METHOD FOR IDENTIFYING CYBERTHREATS FROM UNSTRUCTURED SOCIAL MEDIA CONTENT," both of which are hereby fully incorporated by reference herein for all purposes.

TECHNICAL FIELD

This invention relates generally to cybersecurity. More particularly, this invention relates to systems, methods, and computer program products for classifying unstructured social content for cybersecurity purposes.

BACKGROUND OF THE RELATED ART

Organizations may be exposed to various potential cyberthreats to the security of their assets and/or the safety of their personnel, including discussions of vulnerabilities, communications relating to attacks, or breach reports associated with the organization. Organizations may therefore employ a variety of technologies to monitor the digital universe and identify potential cyberthreats.

However, it is difficult, if not impossible for threat detection and notification systems to stay abreast of new cyberthreats in real-time. One technical challenge is posed by the vast amount of information that continues to grow exponentially and around the clock in the digital universe. Another technical challenge is the evolving nature of cyberthreats, both in speed and type. Yet another technical challenge is programming, configuring, and/or updating current threat detection and notification systems typically require substantial user involvement. As such, existing threat detection and notification systems often are not able to provide organizations with sufficiently accurate and timely notice to allow the organizations to adequately protect themselves from cyberthreats.

In view of the foregoing, there is a need for a new technical solution that can process massive amount of information to accurately and timely identify cyberthreats without requiring substantial user involvement. Embodiments of an invention disclosed herein can address this need and more.

SUMMARY OF THE DISCLOSURE

A goal of the invention disclosed herein is to provide a computer-implemented solution that can automatically programmatically continuously classify unstructured social content so that the ever changing cyberthreats contained therein can be accurately and promptly detected without requiring substantial user involvement. In embodiments disclosed herein, this goal is achieved with a high-precision cybersecurity classifier that can be trained in an automated, dynamic manner. The high-precision cybersecurity classifier thus trained can process massive amount of information and automatically programmatically classify unstructured social content.

For example, suppose a target of interest relates to a newly discovered cyberthreat such as a malware, a brand, an organization, a website, or a combination thereof, an authorized user such as an administrator or a network security technician can provide the target of interest to a cyberthreat detection system (e.g., through a user interface provided by the cyberthreat detection system) and request the cyberthreat detection system to update its cybersecurity classifier on-demand dynamically. Alternatively or additionally, the target of interest may be added to a file or a data store and the cyberthreat detection system can be adapted to update its cybersecurity classifier on a continuous or periodic basis.

In some embodiments, the cyberthreat detection system can query a content database storing unstructured content with a query that contains a set of keywords corresponding to or representing the target of interest. Responsive to the query, the content database returns unstructured content items to the cyberthreat detection system. Each of the unstructured content items contains the set of keywords. The cyberthreat detection system can then cluster the unstructured content items received from the content database into a plurality of clusters based on topics found in the unstructured content items received from the content database. From the plurality of clusters, the cyberthreat detection system can determine a cluster of interest (e.g., a cybersecurity cluster) using a list of vetted phrases (e.g., a list of vetted cybersecurity phrases). Each vetted phrase consists of a combination of high-precision keywords that have been previously reviewed and approved (e.g., by a network security analyst). The cybersecurity cluster thus determined consists of a subset of the unstructured content items, each having the set of keywords and some percentage of the vetted phrases.

In some embodiments, the cyberthreat detection system is adapted to determine whether a ratio of the subset of the unstructured content items having the set of keywords as compared to the unstructured content items received from the content database meets or exceeds a predetermined threshold. In some embodiments, if the ratio of the subset of the unstructured content items having the set of keywords as compared to the unstructured content items received from the content database does not meet the predetermined threshold, the cyberthreat detection system is adapted to determine top words or phrases from other clusters (e.g., any cluster in the plurality of clusters that is not the cybersecurity cluster), modify the query with filter conditions based on the top words or phrases determined from each of the plurality of clusters that is not the cybersecurity cluster, and iteratively perform the querying, the clustering, and the determining until the ratio meets or exceeds the predetermined threshold.

In some embodiments, if the ratio meets or exceeds the predetermined threshold, the cyberthreat detection system is adapted to save the query as a new classifier rule in a rules database. The classifier rule, which contains the set of keywords corresponding to or representing the target of interest, can then be used a cybersecurity classifier of the cyberthreat detection system to quickly and accurately classify unstructured content, such as content sourced from social media, for cybersecurity purposes without further user involvement.

In some embodiments, the cybersecurity classifier is adapted for applying the classifier rule to the content sourced from the social media and, responsive to the classifier rule being met, flagging the content sourced from the social media as containing a cyberthreat. In some embodiments, the cyberthreat detection system is adapted for notifying a user about social media content that has been detected as containing a cyberthreat. In some embodiments, the cyberthreat detection system may perform this notification in various ways, including through an email, a message, a user interface, or a combination thereof.

In this way, the cyberthreat detection system can stay abreast of new cyberthreats in real-time and automatically programmatically classify unstructured social content so that potential cyberthreats contained therein can be promptly and accurately identified.

One embodiment may comprise a system having a processor and a memory and configured to implement a method disclosed herein. One embodiment may comprise a computer program product that comprises a non-transitory computer-readable storage medium storing computer instructions that are executable by a processor to perform the location threat monitoring method disclosed herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Figure 1:
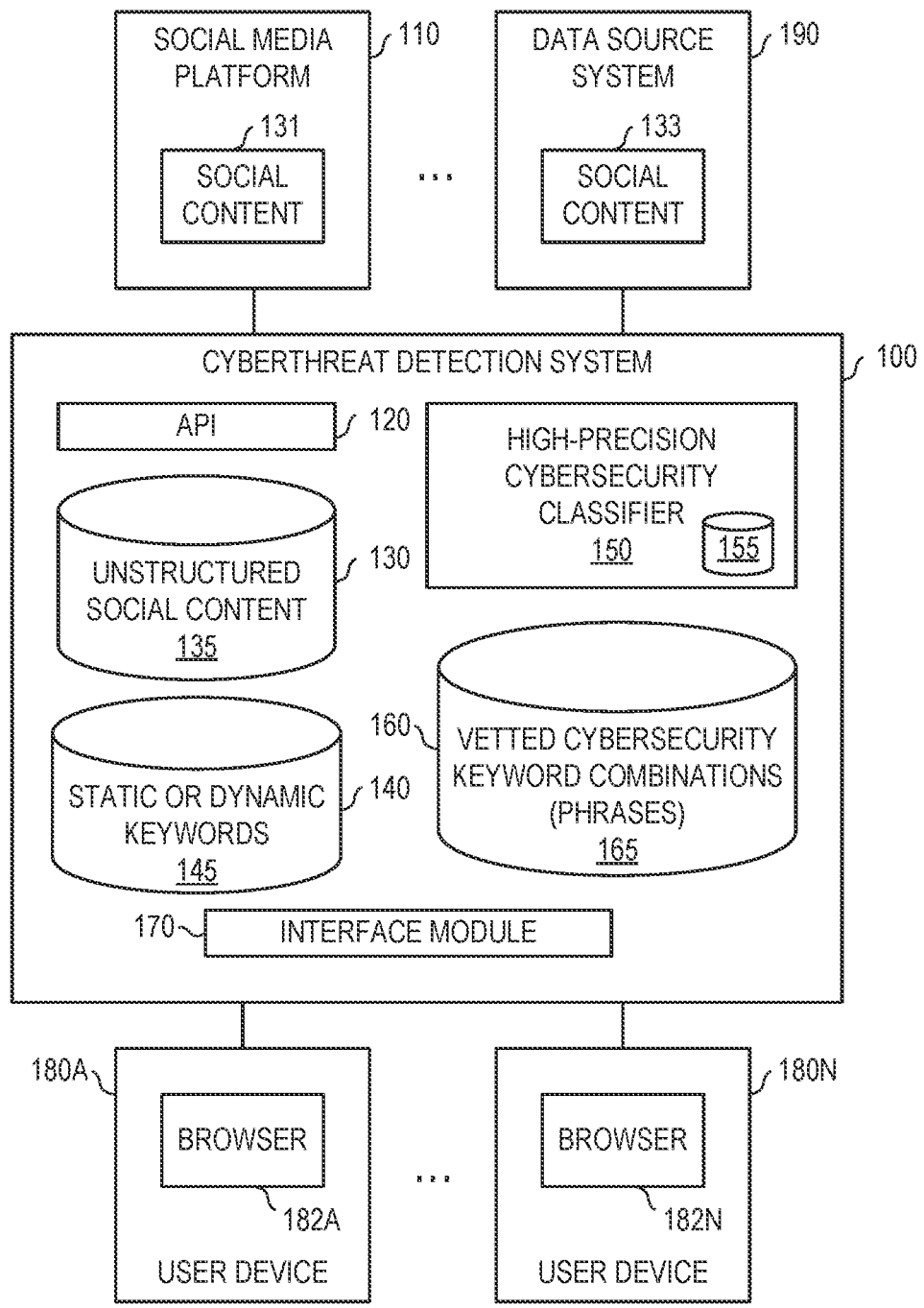
FIG. 1 depicts a diagrammatic representation of a network computing environment in which a cyberthreat detection system having a high-precision cybersecurity classifier disclosed herein can be implemented according to some embodiments.

FIG. 1 depicts a diagrammatic representation of a cyberthreat detection system 100 operating in a network computing environment and having a classifier 150 according to some embodiments. Although classifier 150 is referred to herein as a high-precision cybersecurity classifier, skilled artisans appreciate that alternative names may also be given to classifier 150 (e.g., cyberthreat classifier, cybersecurity classifier, etc.).

In this disclosure, the term "precision" refers to the level of closeness and is distinguished from the term "accuracy." "Accuracy" refers to how close a measurement is to the correct, actual, or true value for that measurement. "Precision" refers to how close the measured values are to each other (i.e., the spread or resolution of the measured values). A measurement system can be accurate but not precise, precise but not accurate, neither, or both.

As a non-limiting example, a list of "high-precision" keyword combinations (referred to herein as "phrases") means that the phrases on the list are all very close to each other. In this example, the phrases are not measured against a correct, actual, or true value. Rather, they are measured against one another. There are many ways to determine high precision phrases. One way is to have a domain expert such as a network security analyst determine what security phrases are considered high-precision phrases and add them to the list. Another way is to perform a semantic analysis on a set of candidate phrases and determine, based on the meaning of each candidate phrase, the range or spread between the most distinct pair of candidate phrases. The range or spread represents the resolution and hence the level of precision for the set of candidate phrases. This process can be repeated for another set of candidate phrases until all the sample sets of candidate phrases have been analyzed and the set with the highest level of precision can be added to the list of high-precision phrases. Yet another way is to transform each phrase into a numerical value and calculate a difference between the lowest and the highest values.

As another non-limiting example, a cluster can be considered a "high-precision" cluster when its size is very close to the number of content items in the input. In this example, both the number of content items in the cluster and the number of content items in the input are measured values. Again, neither the number of content items in the cluster nor the number of content items in the input is measured against a correct, actual, or true value. Rather, they are measured against one another. If the difference between them is very small (e.g., 5% or less), the cluster is considered a high-precision cluster.

With this understanding, a high-precision cybersecurity classifier refers to a new type of classifier that can classify unstructured social content that contains phrases highly close to vetted cybersecurity phrases based on classifier rules that can be dynamically added and/or updated.

As illustrated in FIG. 1, unstructured social content 131, 133 may be sourced (e.g., crawled, received, obtained, etc.) from various source systems (e.g., social media platform 110, data source system 190 such as a data service provider, etc.) that are communicatively connected to cyberthreat detection system 100 through appropriate communication means (e.g., an application programming interface (API) module 120 making a call to an API provided by a source system, etc.). Cyberthreat detection system 100, in turn, can store the unstructured social content 131, 133 as unstructured social content 135 in a content database 130.

In some embodiments, combinations of static keywords, dynamic keywords and/or regular expressions (character strings) can be provided to cyberthreat detection system 100 (e.g., by a user of user device 180A ... 180N through a user interface of cyberthreat detection system 100). The user interface may be provided by an interface module 170 of cyberthreat detection system 100 and displayed through a browser (e.g., browser 182A ... 182N). Cyberthreat detection system 100, in turn, can keep combinations of static keywords, dynamic keywords and/or regular expressions (character strings) 145 in a file or data store 140. Examples of static keywords can include predetermined words of interest such as "phishing," "email," a brand name, etc. Dynamic keywords can be words dynamically provided to cyberthreat detection system 100 through a user interface of cyberthreat detection system 100, for instance, at query time.

In some embodiments, vetted cybersecurity phrases 165 can be provided to cyberthreat detection system 100 (e.g., by a user of user device 180A ... 180N through a user interface of cyberthreat detection system 100). The user interface may be provided by an interface module 170 of cyberthreat detection system 100 and displayed through a browser (e.g., browser 182A ... 182N). Cyberthreat detection system 100, in turn, can vetted cybersecurity phrases 165 in a file or data store 160.

In some embodiments, classifier 150 includes a rules database 155 for storing classifier rules. As explained below, classifier 150 is adapted for examining combinations of static keywords, dynamic keywords and/or regular expressions (character strings) 145 utilizing vetted cybersecurity phrases 165 and automatically identifying high-precision phrases that can be utilized to update rules database 155. Although embodiments disclosed herein are directed to cybersecurity, those skilled in the art will appreciate that the invention disclosed herein can be adapted for updating any classifier that uses dynamic keywords which can change overtime.

As a non-limiting example, cyberthreat detection system 100 can be configured for monitoring network communications, which include unstructured content to and from a digital medium (e.g., a social network such as TWITTER, a video sharing platform such as YOUTUBE, etc.), in the context of a target of interest (e.g., posts mentioning (directly or indirectly) an entity, a brand associated with the entity, a trademark owned by the entity or associated with the brand owned by the entity, the entity's handle on a social network, a website of the entity, etc.). This monitoring can be done by an intermediary or a third-party provider (i.e., a party that is neither the entity nor the operator of the digital medium) through, for instance, an API provided by the digital medium.

In some embodiments, this monitoring includes processing the unstructured content to identify which content items that refer to the target of interest constitute cyberthreats. This processing can include searching the unstructured content for keyword combinations that are automatically vetted for high precision.

Figure 2:
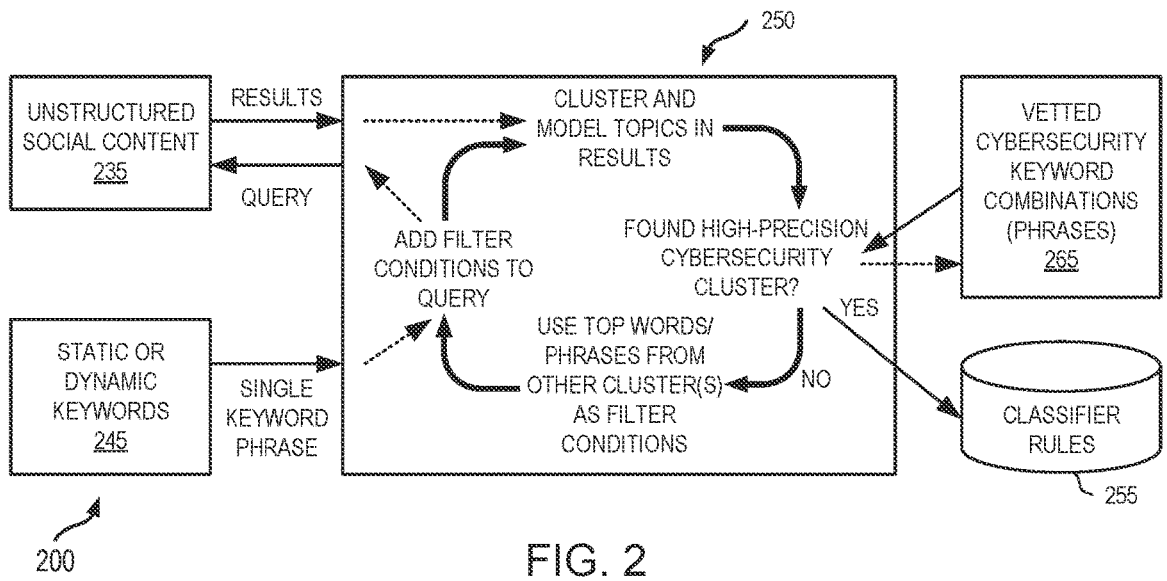
FIG. 2 depicts a diagrammatic representation of a cyberthreat detection system having a high-precision cybersecurity classifier disclosed herein according to some embodiments FIG. 3 a flow chart illustrating a method for automatically dynamically building or updating a high-precision cybersecurity classifier disclosed herein according to some embodiments.
Figure 3:
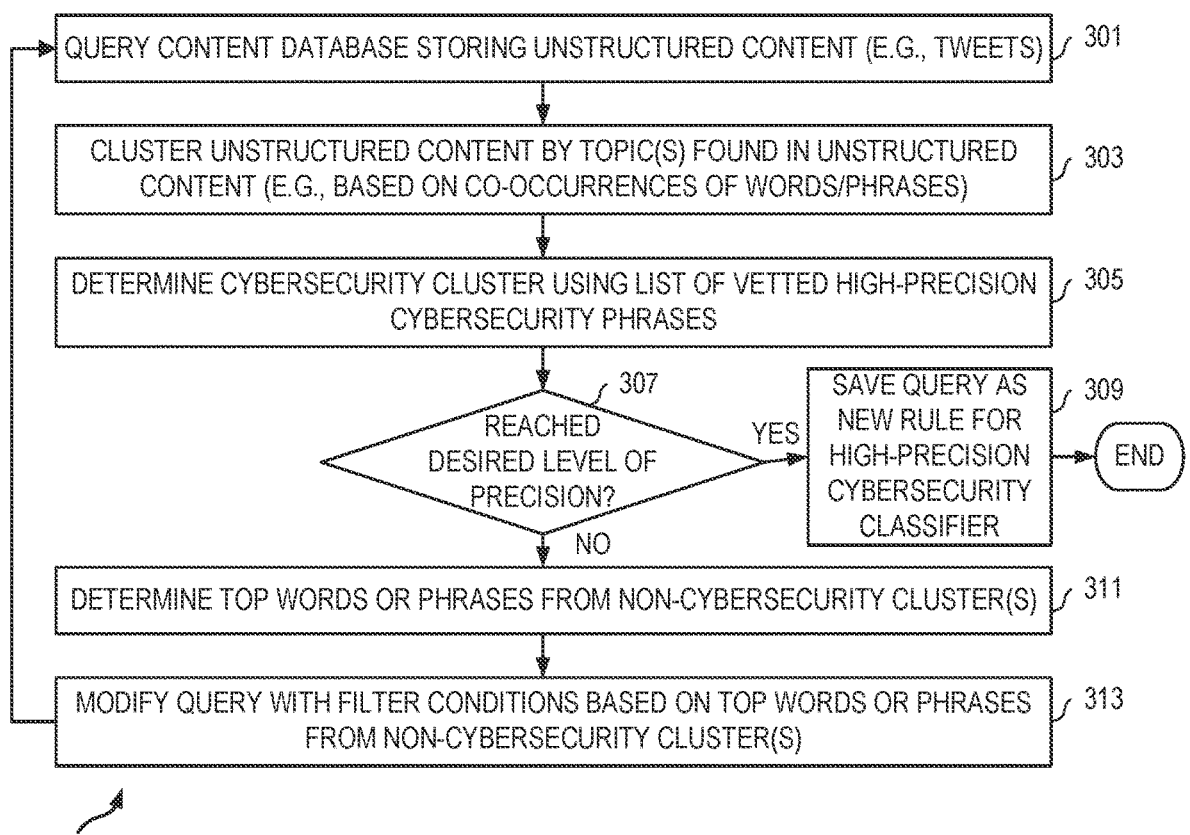

Referring to FIGS. 2 and 3, an automated vetting process 300 by a classifier rules construction module 250 of a cyberthreat detection system 200 can involve querying a large database of unstructured social content 235 (e.g. TWEETS) with a proposed keyword combination (301) and clustering and topic modeling the resultant content (303). The single keyword phrase can come from a user input as discussed above or from a file or data store 245.

Figure 4A:
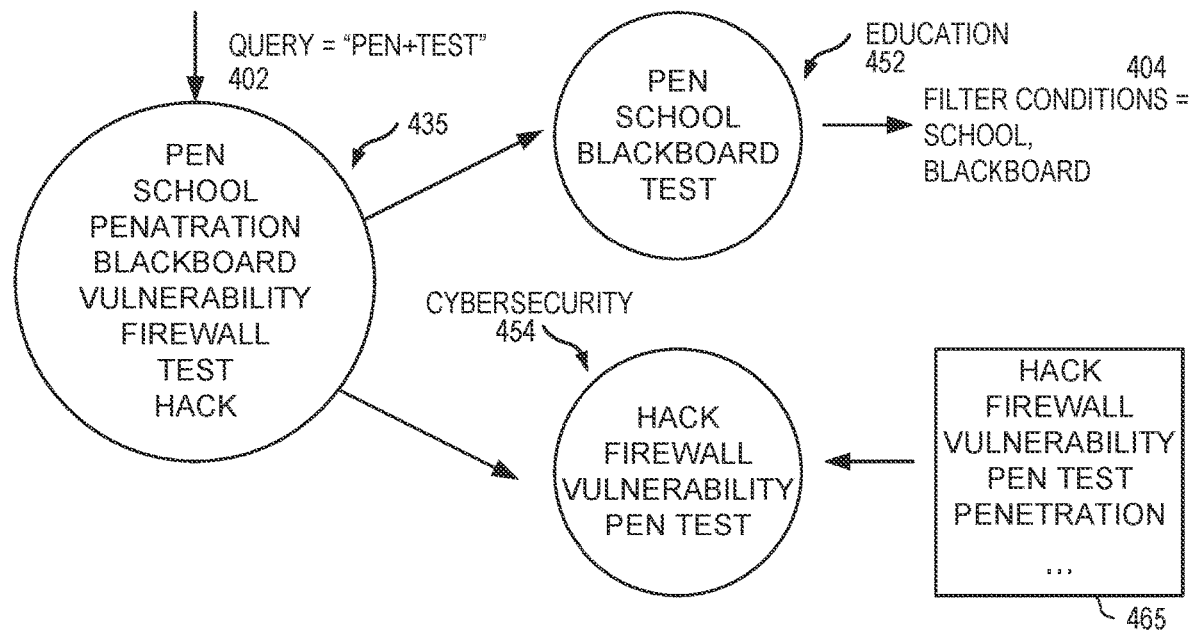
FIGS. 4A-4B together illustrate an iterative process of refining a query composed of input keywords and filtering out false positives to produce an outcome that is then saved as a new classifier rule for a high-precision cybersecurity classifier disclosed herein according to some embodiments.

As illustrated in FIG. 4A, an example of a query 402 may contain a single keyword phrase (e.g., "pen+test"), while unstructured social content 435 may include content items, each of which may or may not mention any of the words in the single keyword phrase. In this example, many content items that contain "pen" and "test" may not be associated with "penetration test" which is colloquially known as a "pen test," "pentest," or "ethical hacking." In the context of cybersecurity, a pen test refers to an authorized simulated cyberattack on a computer system, performed to evaluate the security of the system. Thus, in the context of cybersecurity, the phrase "pen test" may occur along with vetted cybersecurity phrases like "hack firewall vulnerability." However, in the context of education, the words "pen" and "test" may be associated with a student taking a pen to his school for a test and, thus, may occur along with combination of words like "school blackboard."

To this end, clustering and topic modeling can be used to produce two or more clusters.

For instance, a clustering algorithm (e.g., k-means clustering, k-nearest neighbors cluster, etc.) that clusters textual inputs based on co-occurrences of words therein can be used to cluster unstructured social content 435. These techniques (e.g., k-means clustering, k-nearest neighbors cluster, etc.) can be used on numeric data. To translate textual inputs into numeric data, in some embodiments, co-occurrence of words can be used to produce binary vectors (e.g., in the manner of tf-idf, or TFIDF, short for term frequency—inverse document frequency). In some embodiments, a neural network can be pre-trained on sample tweets to "vectorize" the incoming tweets and align semantically similar tweets together. This class of neural networks is called "language models" (pretrained models on sample tweets) and "Siamese networks" (models that align similar tweets together). By vectorizing textual inputs into numeric data, this process allows the underlying system to cluster or otherwise align unstructured social content by meaning.

Likewise, topic modeling is a separate but analogous technique that can accomplish a similar goal—vectorize and align. Topic modeling is a frequently used text-mining tool for discovering hidden semantic structures in a text body. A topic model is a type of statistical model for discovering the abstract "topics" that occur in the input textual data. In the context of textual data, clustering and topic modeling are two types of commonly used unsupervised learning algorithms and thus are not further described herein.

The size (e.g., the number of TWEETS), purity (e.g., the number of topics), and total number of the resultant clusters (e.g., clusters 452, 454) are examined to determine a cybersecurity cluster (305). This determination can be made utilizing vetted cybersecurity phrases 265. This step is necessary because, while a human can readily recognize that cluster 452 represents the concept of "education and that cluster 454 represents the concept of "cybersecurity," a machine (e.g., a computer implementing classifier rules construction module 250) does not understand or have knowledge of what concept should be assigned to each resultant cluster. In the example of FIG. 4A, vetted cybersecurity phrases 465 contains "hack firewall vulnerability," "pen test," "penetration test," etc. By comparing phrases found in cluster 452 and cluster 454 against vetted cybersecurity phrases 465, the machine can determine that cluster 454 has a higher percentage of vetted cybersecurity phrases than cluster 452 and, therefore, cluster 454 is a cybersecurity cluster of interest.

At this time, a determination is made as to whether the cybersecurity cluster thus determined meets or exceeds a predetermined threshold representing a desired level of precision (307) in terms of the number of content items in the cybersecurity cluster (e.g., cluster 454) as measured against the number of content items queried from the content database (e.g., the number of items in unstructured social content 435). If the cybersecurity cluster thus determined meets or exceeds the predetermined threshold (e.g., 95% or above), the query (e.g., query 402 "pen+test") is saved as a new classifier rule in classifier rules database 255 (309) and automated vetting process 300 ends.

Figure 4B:
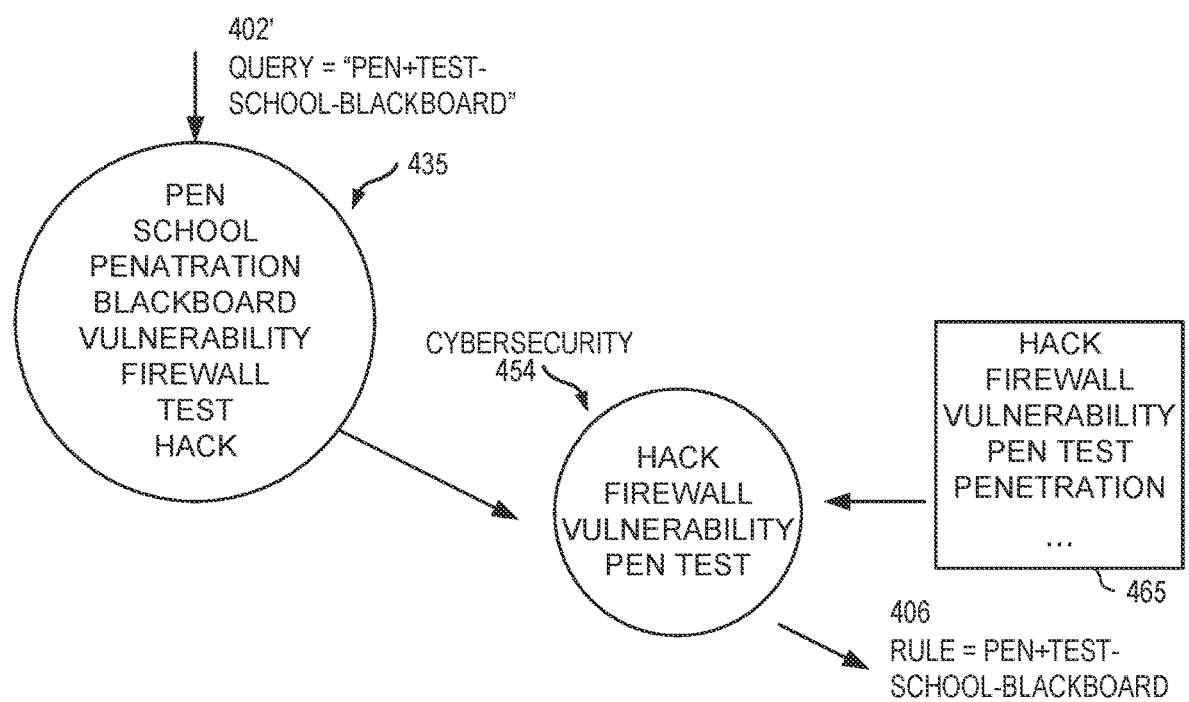

If, however, the cybersecurity cluster thus determined does not meet the predetermined threshold, classifier rules construction module 250 is operable to determine the top words or phrases from the other cluster(s) (311). Such words or phrases (e.g., "school blackboard") are false positives that can be used as filter conditions 404 which, in turn, can be used to refine the query (313). As illustrated in FIG. 4B, the modified query (e.g., query 402') now includes the original set of keywords (e.g., "pen+test") as well as the false positives (e.g., "−school−blackboard"). Since the false positives are used as filter conditions, they are denoted with minus signs in the modified query. If there are more than two clusters, the above-described process can be repeated until there is only one cluster left. In the example of FIG. 4B, querying and clustering unstructured social content 435 with modified query 402' ("pen+test−school−blackboard") results in cluster 454 which is determined as meeting the predetermined threshold. Accordingly, modified query 402' is saved as a new classifier rule 406 (e.g., in rules database 155).

In some embodiments, low-precision keywords and/or phrases can be modified with predefined cybersecurity-related words and the automated vetting process described above can be repeated for the modified keywords and/or phrases. As discussed above, high-precision phrases thus vetted can be stored in a rules database that is accessible by the cybersecurity classifier. The rules database may store classifier rules thus constructed based on static high-precision keywords as well as dynamic high-precision keywords.

Static high-precision keywords can include specific combination of words such as "phishing," "email," and a brand. Such high-precision keywords can be combined with lower-precision keywords. For instance, the combination of a brand plus a new malware variant called "poison ivy" may have a lower level of precision than the combination of a brand plus "phishing email" because "poison ivy" may occur with words such as "rash" and "leaf" that are not related to cybersecurity. As another example, the combination of an entity's name and the word "vulnerability" may not be precise enough to trigger an instance of cyberthreat as "vulnerability" can broadly apply to many scenarios not related to cybersecurity.

In some embodiments, high-precision vetted phrases stored in database 160 can include a running list of malware and/or variants thereof. The list can be provided and/or updated by, for instance, security researchers. Alternatively, in some embodiments, high-precision vetted phrases stored in database 160 can be automatically updated, for instance, by adding the automatically vetted phrase (e.g., "pen test") from the final modified query (e.g., modified query 402') to list of high-precision vetted phrases 465. While this automation may lower the level of precision, another embodiment can include a periodic monitoring and manual revision. That is, high-precision vetted phrases stored in database 160 can be manually maintained, automatically maintained, or automatically updated and manually reviewed and maintained.

Other implementation may also be possible. As a non-limiting example, a process for automatically dynamically constructing a classifier rule can include querying a batch or set (e.g., 100K) of TWEETS containing a dynamic keyword (e.g., a brand called "Brand") from a content database, comparing TWEETS having a combination of the dynamic keyword (e.g., "Brand") and previously vetted high-precision phrases such as "phishing email" with TWEETS that do not have the combination, and finding low precision keywords based on a ratio between the two.

In some cases, comparing TWEETS with the dynamic keyword "Brand" and TWEETS with a combination of the dynamic keyword "Brand" plus various vetted high-precision phrases, and identifying a number of topics in each cluster thus formed can help in identifying clusters of dynamic high-precision keywords. For instance, a cluster of TWEETS having the dynamic keyword "Brand" may have a high number of TWEETS and a lot of topics. Likewise, a cluster of TWEETS having the dynamic keyword "Brand" and "vulnerability" may have a lot of topics and a low number of TWEETS. Both clusters of TWEETS will be discarded and not considered by the cybersecurity classifier due to low precision. However, a cluster of TWEETS with few topics (e.g., a single topic) and certain number (e.g., one that reaches or exceeds a threshold) of TWEETS containing the same combination of keywords can be considered high precision and used to update the rules database.

Combining the vetted high-precision phrases and dynamically vetting new high-precision phrases, the cybersecurity classifier can precisely identify content containing a cyberthreat in real-time and generate a cyberthreat report and/or notification. In this way, the cybersecurity classifier disclosed herein can timely and accurately determine which items in a batch or set of content items contain cyberthreats without requiring substantial user involvement.

Figure 5:
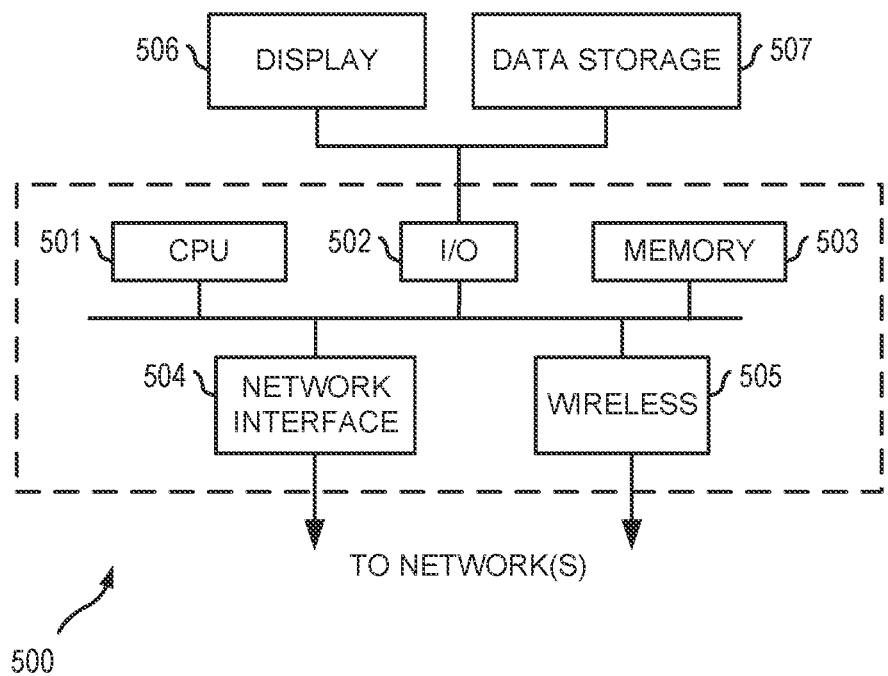
FIG. 5 depicts a diagrammatic representation of a data processing system for implementing a cyberthreat detection system disclosed herein.

FIG. 5 depicts a diagrammatic representation of a data processing system for implementing a cyberthreat detection system disclosed herein. As shown in FIG. 5, data processing system 500 may include one or more central processing units (CPU) or processors 501 coupled to one or more user input/output (I/O) devices 502 and memory devices 503. Examples of I/O devices 502 may include, but are not limited to, keyboards, displays, monitors, touch screens, printers, electronic pointing devices such as mice, trackballs, styluses, touch pads, or the like. Examples of memory devices 503 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 500 can be coupled to display 506, information device 507 and various peripheral devices (not shown), such as printers, plotters, speakers, etc. through I/O devices 502.

Data processing system 500 may also be coupled to external computers or other devices through network interface 504, wireless transceiver 505, or other means that is coupled to a network such as a local area network (LAN), wide area network (WAN), or the Internet. Those skilled in the relevant art will appreciate that the invention can be implemented or practiced with other computer system configurations, including without limitation multi-processor systems, network devices, mini-computers, mainframe computers, data processors, and the like.

The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips.

Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, JavaScript, HyperText Markup Language (HTML), Python, or any other programming or scripting code. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed:

1. A method, comprising:
    sending, by a computer, a query containing keywords to a content database;
    receiving, by the computer, unstructured content items from the content database, each of the unstructured content items containing the keywords;
    determining, by the computer, topics based on the unstructured content items received from the content database;
    clustering, by a computer based at least on the topics, the unstructured content items into a plurality of clusters;
    determining, by the computer, a cluster of interest from the plurality of clusters based at least in part on a percentage of vetted cybersecurity phrases in each of the unstructured content items received from the content database, wherein the cluster of interest has a higher percentage of the vetted cybersecurity phrases than the rest of the plurality of clusters;
    determining, by the computer, whether the cluster of interest meets or exceeds a predetermined threshold representing a desired level of precision in terms of a number of unstructured content items in the cluster of interest as measured against a number of unstructured content items received from the content database; and
    responsive to the cluster of interest meeting or exceeding the predetermined threshold, storing, by the computer, the query as a classifier rule in a rules database such that a cybersecurity classifier is able to classify unstructured social content using the classifier rule generated based on the query.

2. The method according to claim 1, further comprising:
    responsive to the cluster of interest not meeting the predetermined threshold, iteratively performing:
        determining top words or phrases from each of the plurality of clusters that is not the cluster of interest;
        modifying the query with filter conditions based on the top words or phrases determined from each of the plurality of clusters that is not the cluster of interest;
        querying the content database with the modified query;
        determining topics based on results received from the content database;
        clustering the results based on the topics; and
        determining a cluster of interest from the clustered results until the cluster of interest thus determined meets or exceeds the predetermined threshold.

3. The method according to claim 1, wherein at least one of the vetted cybersecurity phrases consists of a combination of high-precision keywords that have been measured against one another as being very close to each other.

4. The method according to claim 1, further comprising:
    comparing the number of unstructured content items in the cluster of interest and the number of unstructured content items received from the content database; and
    determining whether the cluster of interest represents a high-precision cluster based on the comparing.

5. The method according to claim 1, wherein the desired level of precision corresponds to a 5% or less difference between the number of unstructured content items in the cluster of interest and the number of unstructured content items received from the content database.

6. The method according to claim 1, wherein the determining the cluster of interest from the plurality of clusters further comprises, for each respective cluster, examining at least one of a size of unstructured content items in the respective cluster or a number of topics in the respective cluster.

7. The method according to claim 1, further comprising:
updating a database storing the list of vetted cybersecurity phrases to include the keywords contained in the classifier rule.

8. A system, comprising:
a processor;
a non-transitory computer-readable medium; and
instructions stored on the non-transitory computer-readable medium and translatable by the processor for:
sending a query containing keywords to a content database;
receiving unstructured content items from the content database, each of the unstructured content items containing the keywords;
determining topics based on the unstructured content items received from the content database;
clustering, based at least on the topics, the unstructured content items into a plurality of clusters;
determining a cluster of interest from the plurality of clusters based at least in part on a percentage of vetted cybersecurity phrases in each of the unstructured content items received from the content database, wherein the cluster of interest has a higher percentage of the vetted cybersecurity phrases than the rest of the plurality of clusters;
determining whether the cluster of interest meets or exceeds a predetermined threshold representing a desired level of precision in terms of a number of unstructured content items in the cluster of interest as measured against a number of unstructured content items received from the content database; and
responsive to the cluster of interest meeting or exceeding the predetermined threshold, storing the query as a classifier rule in a rules database such that a cybersecurity classifier is able to classify unstructured social content using the classifier rule generated based on the query.

9. The system of claim 8, wherein the instructions are further translatable by the processor for:
responsive to the cluster of interest not meeting the predetermined threshold, iteratively performing:
determining top words or phrases from each of the plurality of clusters that is not the cluster of interest;
modifying the query with filter conditions based on the top words or phrases determined from each of the plurality of clusters that is not the cluster of interest;
querying the content database with the modified query;
determining topics based on results received from the content database;
clustering the results based on the topics; and
determining a cluster of interest from the clustered results until the cluster of interest thus determined meets or exceeds the predetermined threshold.

10. The system of claim 8, wherein at least one of the vetted cybersecurity phrases consists of a combination of high-precision keywords that have been measured against one another as being very close to each other.

11. The system of claim 8, wherein the instructions are further translatable by the processor for:
comparing the number of unstructured content items in the cluster of interest and the number of unstructured content items received from the content database; and
determining whether the cluster of interest represents a high-precision cluster based on the comparing.

12. The system of claim 8, wherein the desired level of precision corresponds to a 5% or less difference between the number of unstructured content items in the cluster of interest and the number of unstructured content items received from the content database.

13. The system of claim 8, wherein the determining the cluster of interest from the plurality of clusters further comprises, for each respective cluster, examining at least one of a size of unstructured content items in the respective cluster or a number of topics in the respective cluster.

14. The system of claim 8, wherein the instructions are further translatable by the processor for:
updating a database storing the list of vetted cybersecurity phrases to include the keywords contained in the classifier rule.

15. A computer program product comprising a non-transitory computer-readable medium storing instructions translatable by a processor for:
sending a query containing keywords to a content database;
receiving unstructured content items from the content database, each of the unstructured content items containing the keywords;
determining topics based on the unstructured content items received from the content database;
clustering, based at least on the topics, the unstructured content items into a plurality of clusters;
determining a cluster of interest from the plurality of clusters based at least in part on a percentage of vetted cybersecurity phrases in each of the unstructured content items received from the content database, wherein the cluster of interest has a higher percentage of the vetted cybersecurity phrases than the rest of the plurality of clusters;
determining whether the cluster of interest meets or exceeds a predetermined threshold representing a desired level of precision in terms of a number of unstructured content items in the cluster of interest as measured against a number of unstructured content items received from the content database; and
responsive to the cluster of interest meeting or exceeding the predetermined threshold, storing the query as a classifier rule in a rules database such that a cybersecurity classifier is able to classify unstructured social content using the classifier rule generated based on the query.

16. The computer program product of claim 15, wherein the instructions are further translatable by the processor for:
responsive to the cluster of interest not meeting the predetermined threshold, iteratively performing:
determining top words or phrases from each of the plurality of clusters that is not the cluster of interest;
modifying the query with filter conditions based on the top words or phrases determined from each of the plurality of clusters that is not the cluster of interest;
querying the content database with the modified query;
determining topics based on results received from the content database;
clustering the results based on the topics; and
determining a cluster of interest from the clustered results until the cluster of interest thus determined meets or exceeds the predetermined threshold.

17. The computer program product of claim 15, wherein at least one of the vetted cybersecurity phrases consists of a combination of high-precision keywords that have been measured against one another as being very close to each other.

18. The computer program product of claim 15, wherein the instructions are further translatable by the processor for:

comparing the number of unstructured content items in the cluster of interest and the number of unstructured content items received from the content database; and determining whether the cluster of interest represents a high-precision cluster based on the comparing.

19. The computer program product of claim 15, wherein the desired level of precision corresponds to a 5% or less difference between the number of unstructured content items in the cluster of interest and the number of unstructured content items received from the content database.

20. The computer program product of claim 15, wherein the determining the cluster of interest from the plurality of clusters further comprises, for each respective cluster, examining at least one of a size of unstructured content items in the respective cluster or a number of topics in the respective cluster.

\* \* \* \* \*